United States Patent [19]

Stewart

[11] 4,261,332
[45] Apr. 14, 1981

[54] SOLAR HEATING SYSTEMS

[75] Inventor: John M. Stewart, River Drive Park, Canada

[73] Assignee: Sunglo Solar Ltd., Downsview, Canada

[21] Appl. No.: 66,205

[22] Filed: Aug. 13, 1979

[30] Foreign Application Priority Data

Jun. 4, 1979 [CA] Canada ............................ 328986

[51] Int. Cl.³ ............................................. F24J 3/02
[52] U.S. Cl. .................................. 126/420; 126/416; 126/422; 137/62; 137/861; 417/185; 165/35; 165/71; 165/103
[58] Field of Search ............... 126/420, 422, 423, 415, 126/416, 432, 421, 417; 137/59, 861, 60, 61, 62; 4/172.17, 172.12, 172.14; 165/35, 71, 103; 417/181, 185, 76

[56] References Cited

U.S. PATENT DOCUMENTS

| | | | |
|---|---|---|---|
| 3,299,881 | 1/1967 | Koch | 126/416 |
| 3,906,928 | 9/1975 | Wright | 126/419 |
| 4,102,328 | 7/1978 | Stiff | 126/422 |
| 4,133,338 | 1/1979 | Honikman | 126/420 |
| 4,153,040 | 5/1979 | Harrison | 126/420 |
| 4,191,166 | 3/1980 | Saarem et al. | 126/420 |

*Primary Examiner*—James C. Yeung
*Attorney, Agent, or Firm*—Rogers, Bereskin & Parr

[57] ABSTRACT

A solar heating system for a swimming pool and the like is disclosed. The system includes a circulation circuit having a pump by which water is withdrawn from the pool, passed through a filter and returned to the pool. A solar collector assembly is provided and has flow and return lines connected in said circuit. The flow line is connected to a venturi unit in the main circuit and a control valve is provided immediately downstream of the venturi unit. When the control valve is closed, water is diverted through the venturi unit and into the solar collector assembly for heating. When the valve is open, the venturi unit induces a suction effect in the flow line which causes the solar collector assembly to be positively drained into the circuit. A vacuum breaker admits air to the collector assembly at this time.

9 Claims, 7 Drawing Figures

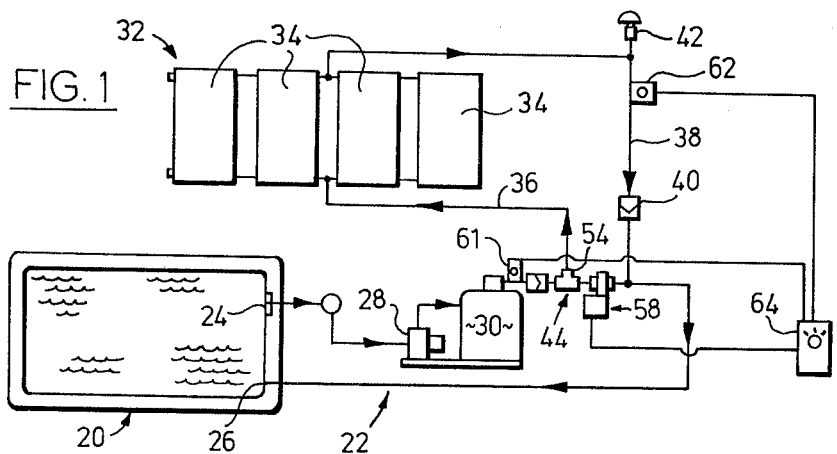
FIG. 1
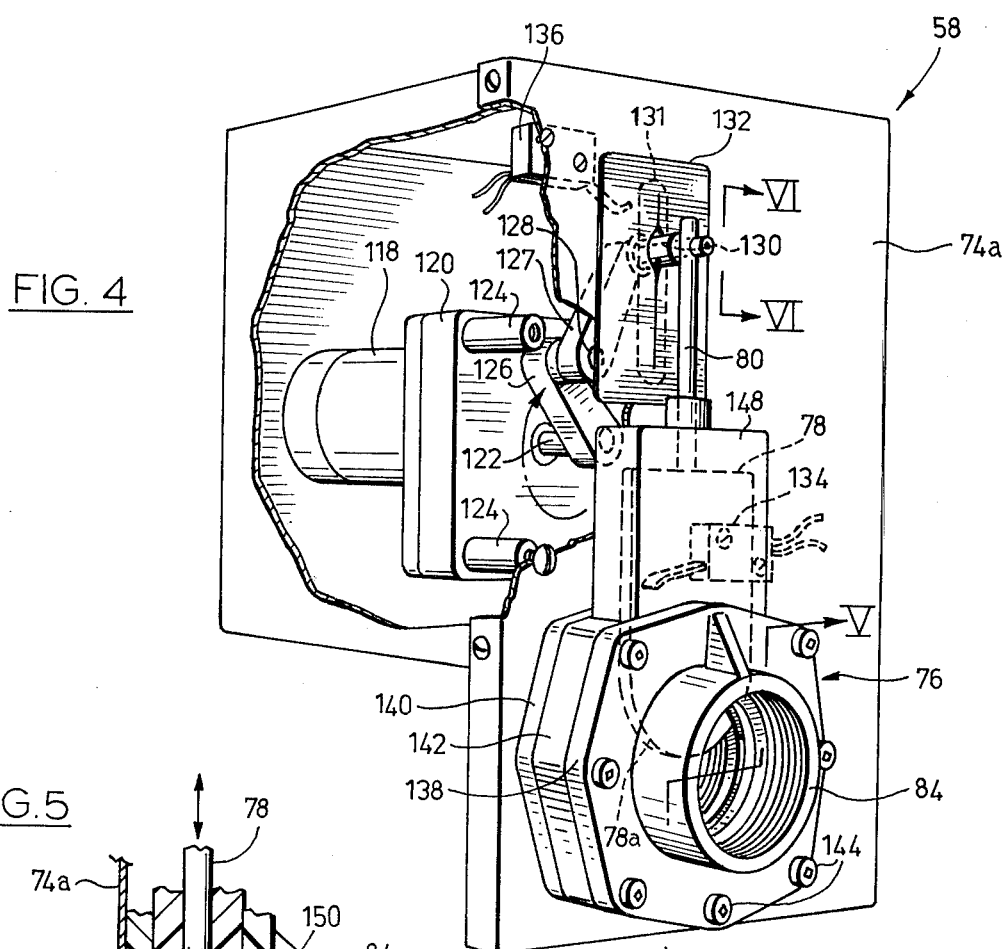
FIG. 4
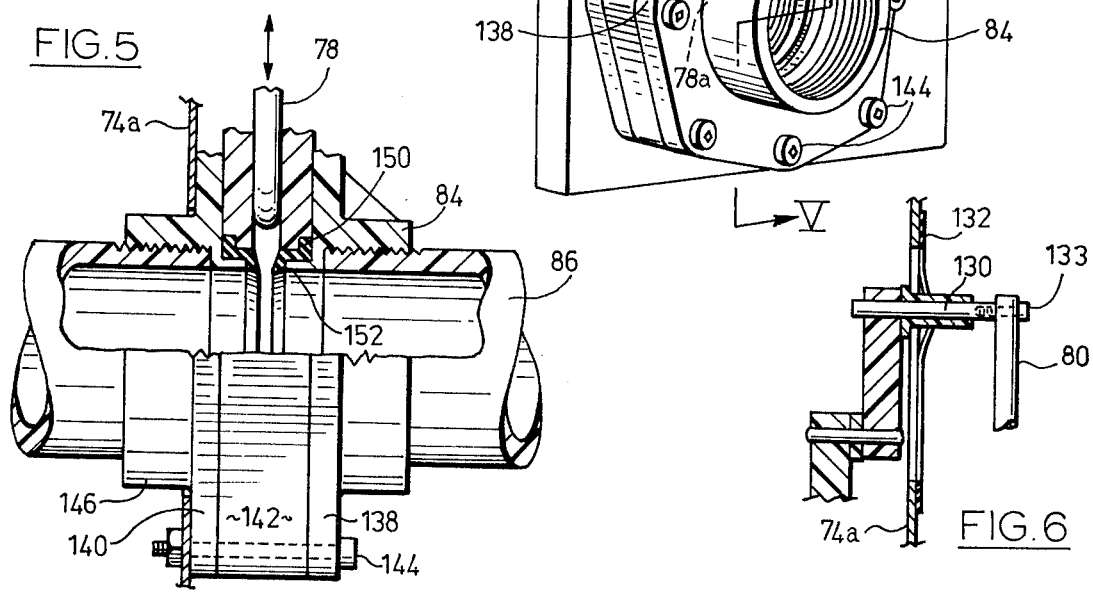
FIG. 5
FIG. 6

SOLAR HEATING SYSTEMS

This invention relates to solar heating systems for swimming pools and the like.

U.S. Pat. No. 3,906,928 (Wright) discloses a typical example of a prior art solar heating system. In the system disclosed in the Wright patent, water in a swimming pool can be circulated through a circuit which includes a circulating pump and filter, and back to the pool in a bypass mode, or the water can be diverted through an array of solar heater panels. The panels are connected in the circulation circuit downstream of the filter and a hydraulically operated pinch valve is located in the main circuit downstream of the solar panel inlet connection. When the pinch valve is open, water bypasses the panels and flows back into the pool, but when the valve is closed, the water is diverted through the panels. A second pinch valve is also normally provided in practice in the inlet connection to the solar panels and is closed when the first mentioned pinch valve is open.

The two pinch valves are operated hydraulically from a four way control valve which is itself controlled by a solar heat sensor. When the sensor indicates that there is insufficient solar energy to raise the temperature of the water in the pool, the pinch valves are operated appropriately to cause the water to bypass the solar heater panels. However, the pinch valve in the inlet connection to the panels will prevent the panels from draining at this time. In other words, the panels will remain filled with water at all times when there is insufficient solar energy to heat the water. This has two primary disadvantages. Firstly, during temporary periods of insufficient solar energy (e.g. on a cloudy day) the water trapped in the panels will rapidly loose heat to the environment and will initially have a cooling effect on the water in the main circuit when the panels again come into operation. More seriously, there is the risk that the water in the panels may freeze at night or during unexpected periods of cold weather, for example, in fall or spring, unless special precautions are taken to deliberately drain the panels. Obviously, this is inconvenient and would not normally be done by the average pool owner.

Another disadvantage of systems of the type shown in the Wright patent is that secondary hydraulic connections are required for operating the pinch valves. Those valves must be connected by hydraulic pressure lines to the control valve and that valve must itself have pressure and exhaust lines connected to the main circulation circuit respectively downstream and upstream of the pump. Not only does this complicate initial installation of the system but, since the valves are operated using water from the swimming pool itself, malfunctions are common due to the presence of debris which accumulates in the water as a result of the presence of leaves and other foreign material in the swimming pool. Special filtering arrangements must be provided, but in practice, the filters themselves rapidly become clogged and must be cleaned frequently.

An object of the present invention to provide an improved solar heating system in which the solar collectors will automatically drain when water is no longer being circulated through the collectors.

According to one aspect of the invention, there is provided a solar heating system for a swimming pool and the like which includes means defining a main water circulation circuit having an inlet through which water can be removed from the pool, and an outlet through which water can be returned to the pool. A pump is provided in said circuit for conveying water from said inlet to said outlet. A solar collector assembly is provided in the system and includes at least one solar collector panel, water flow and return lines connected to said panel and circulation circuit and arranged to allow water to flow from the circuit through the panel from bottom to top and return to the circuit, one-way valve means in the return line for preventing water flowing into the panel along said line, and vacuum breaker means for admitting air to the panel during drainage of water therefrom. A venturi unit is connected in the circulation circuit and defines a water flow passageway extending from an inlet to an outlet of the unit. The unit also includes a throat disposed in the passageway between the inlet and outlet and a secondary connection communicating with the passageway in the region of the throat so that normal flow of water from the inelt to the outlet produces a suction effect in the secondary connection. The flow line of the solar collector assembly is coupled to the secondary connection of the venturi unit and the return line is coupled in the circulation circuit downstream of the venturi unit. Control valve means is disposed in the circuit between the venturi unit and the return line and is operable between open and closed positions. In the closed position of the control valve means, water is prevented from flowing through the venturi unit outlet and is diverted through its secondary connection and through the solar collector assembly for heating by solar energy and returned to the pool through said return line and circuit outlet. In the open position of the control valve means water flows through the venturi unit from its intlet to its outlet and induces said suction effect in the secondary connection of the unit so that water is drawn by suction from the solar collector assembly and into the circulation circuit, positively draining the collector assembly.

An improved control valve assembly is also provided.

In order that the invention may be more clearly understood, reference will now be made to the accompanying drawings which illustrate a preferred embodiment of the invention by way of example, and in which:

FIG. 1 is a diagrammatic illustration of a solar heating system according to the invention;

FIG. 4 is a perspective view, partly broken away, of the flow control valve used in the system shown in FIG. 1;

Figure 7:
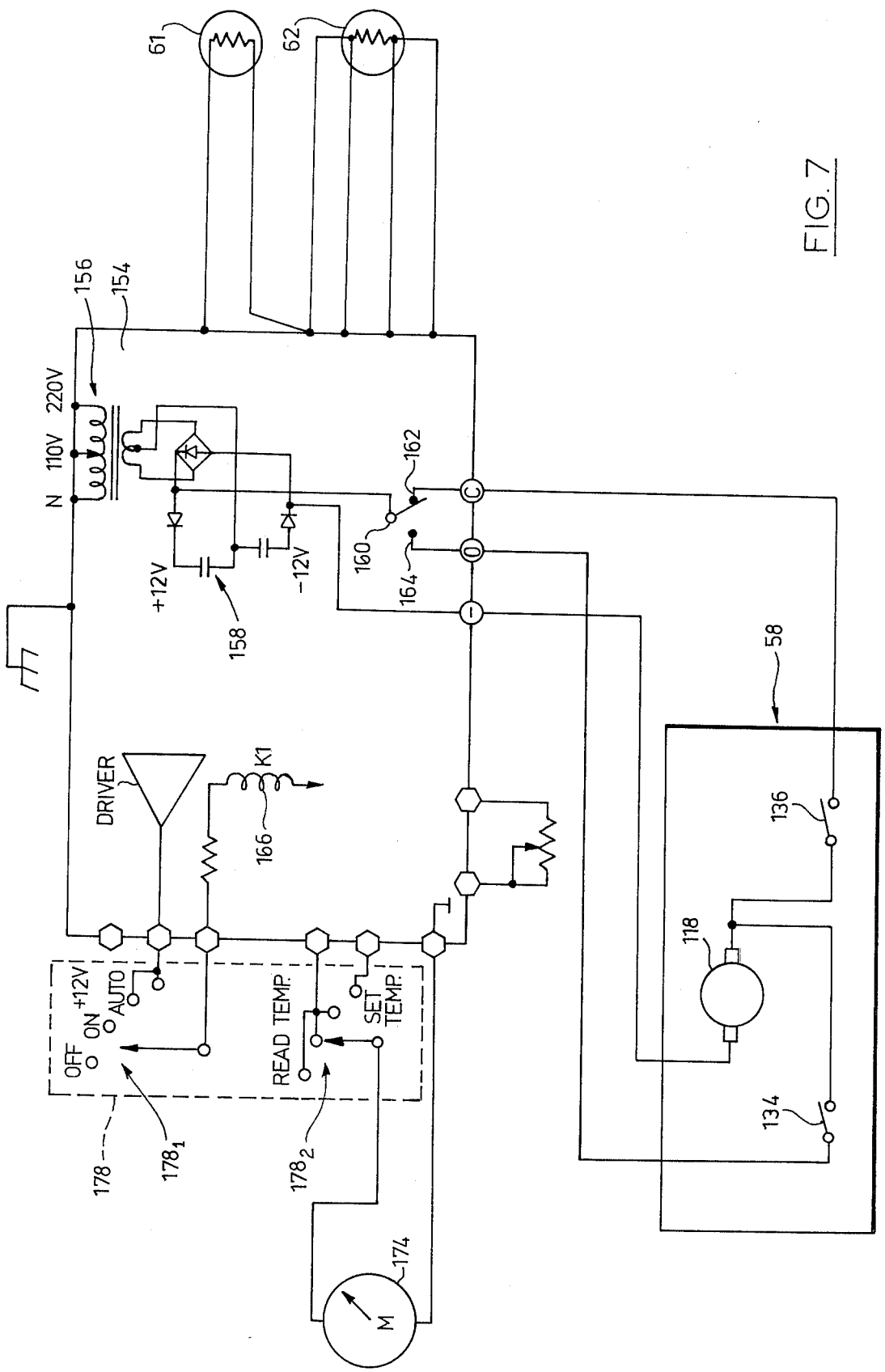

FIGS. 5 and 6 are sectional views on lines V—V and VI—VI respectively of FIG. 4; and, FIG. 7 is a schematic diagram of the electrical circuit of the system of FIG. 1. Reference will first be made to FIG. 1 which diagrammatically illustrates the overall system. A swimming pool is indicated at 20 and has associated therewith a main water circulation circuit, generally denoted 22, defined by suitable piping of the type conventionally employed in swimming pool installations. Circuit 22 has an inlet 24 through which water can be removed from the pool, and an outlet 26 through which water can be returned to the pool. Connected in the circuit downstream of inlet 24 are a pump 28 and a filter 30. These components and the circuit as described so far are entirely conventional; in a typical conventional installation, the outlet connection from filter 30 would be coupled to the circuit outlet 26.

Associated with circuit 22 is a solar collector assembly generally indicated at 32. In this particular embodiment, assembly 32 includes four solar collector panels 34. These panels may be of any appropriate form and may, for example, be of a type described and claimed in Canadian Patent Application Ser. No. 293,284 filed Dec. 16, 1977 in the name of Sunglo Solar Ltd. Assembly 32 also includes flow and return lines 36 and 38 respectively for permitting flow of water through the panels 34 from circuit 22 and return of heated water to the circuit. In a typical installation, the lines 36 and 38 will be made up of plastic piping, e.g. ABS drainage piping and associated fittings, solvent welded together. The panels have upper and lower headers (not specifically illustrated) and the headers in each set are connected together end to end. The connections between the headers are made using ABS plastic fittings and the headers are connected to the flow and return lines using similar fittings. Flow line 36 is connected to the bottom headers between the centre panels and return line 38 is connected to the top headers also between the two centre panels. As a result, when the panels are being filled (see later) they will fill from bottom to top, whereas when they are being drained they will drain from top to bottom.

A one-way valve 40 is provided in return line 38 for preventing flow of water into the panels along that line, i.e. in the direction opposite to the arrows in FIG. 1. A conventional vacuum breaker unit 42 is provided at the highest point in line 38 for admitting air to the panels during draining of water therefrom. Unit 42 has not been specifically illustrated because it is of conventional construction. It is sufficient to note that the unit includes a gravity operated valve member which communicates with water in line 38 and which is lifted by water pressure to close a valve opening in the unit when the panels are in normal operation. When the panel starts to drain as will be described, the valve member drops under gravity and admits air to allow complete drainage of the panels.

A venturi unit generally denoted 44 is provided at the point at which flow line 36 joins the main circulation circuit 22. This unit is shown in more detail in FIGS. 2 and 3. Referring primarily to FIG. 3, venturi unit 44 defines a water flow passageway 46 extending from an inlet 48 to an outlet 50 of the unit. A throat 52 is defined in passageway 46 between the inlet and the outlet and the unit also includes a secondary connection 54 communicating with the passageway immediately downstream of the throat 52 so that normal flow of water from the inlet to the outlet of the unit produces a suction effect in the secondary connection which would tend to draw water into the venturi unit in the direction of the full line arrow denoted 56 in FIG. 3.

The physical structure of the venturi unit will be more specifically described later with reference to FIGS. 2 and 3. For the time being, it will be convenient to refer back to FIG. 1 which shows that the flow line 36 to the solar panels 34 is coupled to the secondary connection 54 of venturi unit 44. Thus, it will be appreciated that the effect of suction in connection 54 will be to draw water from the panels 34. This effect will occur when water flows normally through the venturi unit from its inlet to its outlet in circulating around the main circulation circuit 22. This is the path which the water will follow when the solar collector panels 34 are not in operation but pump 28 is working.

In order to cause water to be diverted through the panels 34, a power operated control valve generally denoted 58 is connected in circuit 22 immediately downstream of the venturi unit. It will also be noted that the return line 38 from the solar panels 34 is connected in circuit 22 immediately downstream of valve 58. In other words, the control valve is disposed between the venturi unit 44 and the return line 38. Valve 58 is shown in detail in FIGS. 4, 5 and 6 and is operable (as will be described) between open and closed positions. In its closed position, valve 58 prevents water flowing through the venturi unit outlet 50 (FIG. 3) and causes the water to be diverted in the direction indicated by the chain line arrow 60 in FIG. 3 to flow through the secondary connection 54 of the venturi unit and through the solar panels 34. After being heated in the solar panels, the water will then return through line 38 to the main circulation circuit 22 and back to the pool 20. This will be the normal mode of operation of the system when solar energy is available for heating the water, i.e. when the sun is out. When the sun goes in, valve 58 will open (as will be described) so that water will once again be able to flow normally through the venturi unit from its inlet to its outlet 50. This will induce a suction effect in the secondary connection 54 of the unit so that water will be drawn by suction from the solar panels and line 36 and be returned to the main circulation circuit, thereby positively draining the panels.

It has been found that substantially all of the water in the panels 34 can be drained within a very short time thereby avoiding any substantial cooling of the water previously in the panels, which would tend to have a cooling effect on the water in the pool when returned to the pool. When the sun comes out again and valve 58 is closed, the water entering venturi unit 44 will be diverted into flow line 36 and will rapidly fill the panels 34 starting from top to bottom. The panels are then ready to resume their normal heating function within a very short time. Pump 28 will normally remain in operation as valve 58 opens and closes during normal day time use of the system and will allow filter 30 to perform its normal function in removing debris from the pool. The pump can similarly remain in operation at night or can be switched off as desired. In either event, the panels 34 will be completely drained of water and there will be no risk of damage to the panels by freezing. Valve 58 can be operated automatically by temperature sensors 61 and 62 by way of a controller 64 so that the valve will automatically open and close according to prevalent temperature conditions. Alternatively, controller 64 can be manually operated. The electrical circuit including the sensor 61, 62 and the controller 64 is shown in FIG. 7 and will be described later.

Figure 2:
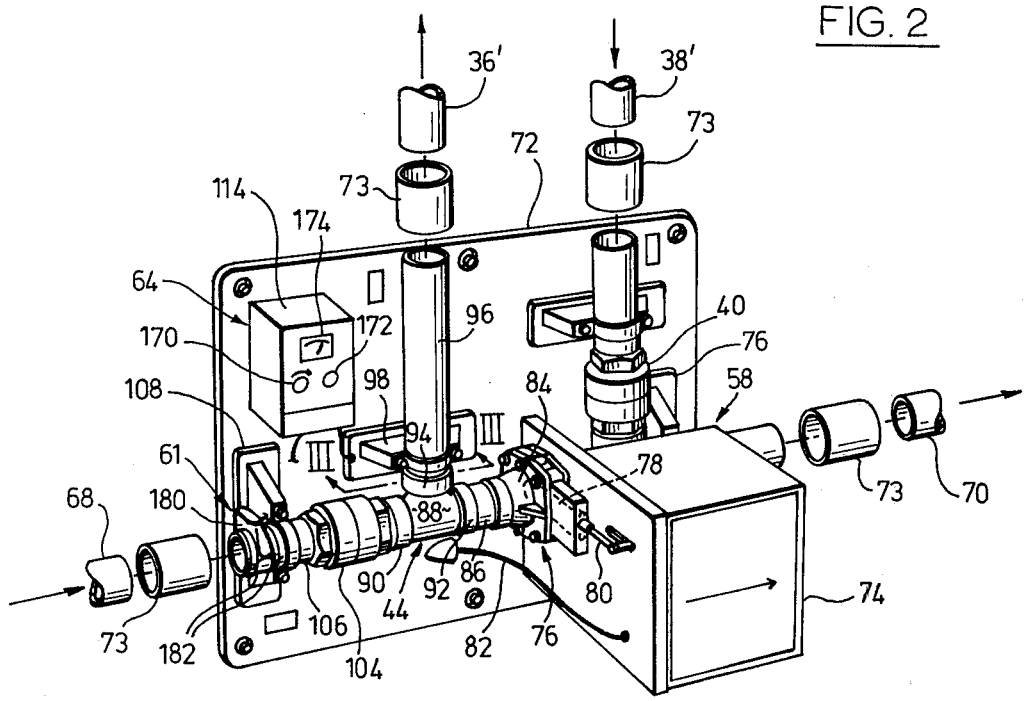
FIG. 2 is a partly exploded perspective view of part of the system shown in FIG. 1.
Figure 3:
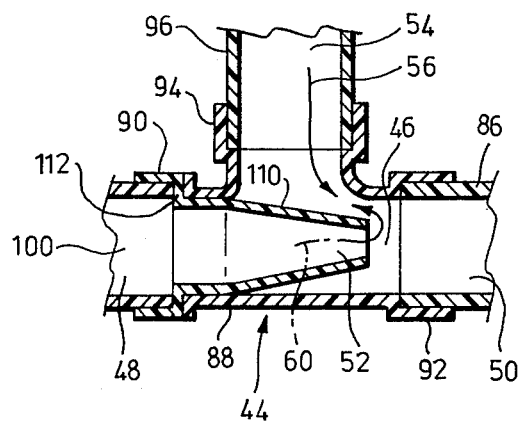
FIG. 3 is a longitudinal sectional view generally on line III—III of FIG. 2.

Reference will now be made to FIG. 2 which shows a pre-assembled unit forming part of the heating system of FIG. 1. The principal components previously referred to in connection with FIG. 1 are the venturi unit 44, control valve 58, controller 64 and the check valve 40. Inner end parts of plastic pipes defining the flow and return lines 36 and 38 to the solar panels 34 are shown in exploded positions and are indicated by reference numerals 36' and 38'. Similarly, part of a pipe extending from the filter 30 in circuit 22 is shown at 68 and part of a similar pipe forming the return line to the pool is indicated at 70.

The components shown in FIG. 2 are pre-mounted on a base board 72, forming a self-contained control apparatus for a solar heating system. The apparatus may be offered for sale as a unit which can be coupled in a conventional pump filtration circuit, and to a remote array of solar collectors using readily available plastic piping and solvent adhesive suitable coupling sleeves are indicated at 73. This makes for straightforward and rapid installation of a solar heating system either in association with an existing pool installation or during construction of a new installation. In an alternative embodiment, other coupling arrangements may of course be used, for example flexible plastic or rubber pipes secured by ring clamps.

Control valve 58 includes a relatively large, box shaped housing 74 which is mounted on base board 72 by way of a bracket 76. Valve 58 is operated by an electric servo motor disposed in housing 74 (see FIG. 4). A valve casing is visible at 76 and is secured to a face of housing 74. A valve member 78 in the form of a slide is mounted for movement into and out of casing 76 for respectively closing and opening the valve. Member 78 is operated by a rod 80 coupled to the servo motor by a linkage to be described. Part of an electrical cord for providing power to the servo motor is visible at 82.

Valve casing 76 has an inlet port defined by an annular sleeve 84 which projects from one side of casing 76. The casing and sleeve 84 are made of an ABS plastic material and sleeve 84 is coupled to the venturi unit 44 by a length of pipe 86 which is solvent welded to sleeve 84 and to the unit.

It will be seen from FIG. 2 that venturi unit 44 has a housing 88 which is of inverted T-shape as seen in that view. In fact, housing 88 is formed by a conventional ABS sanitary drain coupling, in which the secondary connection 54 curves smoothly towards outlet 50, making for smooth flow of water in that direction when the panels are being drained. The housing has integral collars 90, 92 and 94 on its three limbs. As can be seen from FIG. 3, these collars are internally recessed and receive sections of pipe which are solvent welded to the housing. For example, the uppermost limb of the housing (defining the secondary connection 54) receives a length of pipe denoted 96 which is clearly visible in FIG. 2 and is secured to the base board 72 by a bracket 98. That length of pipe is to be coupled by one of the sleeves 73 to pipe 36' of flow line 36.

Solvent welded into the limb of housing 88 which defines venturi unit inlet 48 is a pipe section 100 (FIG. 3) which is coupled to a check valve 104 for preventing return flow of water towards the filter. That valve is in turn fitted with a pipe section 106 (FIG. 2) for coupling to pipe 68 by a coupling sleeve 73. A bracket 108 holds section 106 to the base board 72.

Similar coupling arrangements are provided for the solar panel return line 38 but will not be described in detail since they are believed to be self evident from the drawings. Suffice it to say that the check valve 40 is coupled into the main circulation circuit 22 by a plain T-shaped coupling unit similar to the housing 88 of venturi unit 46.

Referring back to FIG. 3, the venturi unit differs from a plain coupling in that it is fitted with a nozzle-like insert 110 which defines the venturi throat. Insert 110 fits snugly into the inlet limb of housing 88 and has a flange 112 at its outer end which seats in the recess in collar 90 and is solvent welded therein.

As was mentioned previously, the controller 64 of the system is mounted on base board 72. The casing of the controller is visible at 114 in that view and an electric power cord for the controller is denoted 116.

Reference will now be made to FIGS. 4, 5 and 6 in describing the control valve 58. FIG. 4 shows part of the housing 74 broken away to show the electric servo motor 118 used to operate the valve. Motor 118 has an output shaft (not visible) coupled to a gearbox 120 having a low speed output shaft 122. Gearbox is coupled by legs 124 and screws 126 to lid 74a of housing 74. Output shaft 120 is fitted with a linkage comprising two plastic links 126, 127 coupled together by a pivot pin 128. The links 126, 127 are made of a plastic material so as to eliminate any possibility of an electrical connection between motor 118 and the water flowing in the piping coupled to the valve assembly. Link 126 is rigidly coupled to shaft 120 while the outer end of link 127 is fitted with a pin 130 which projects through a slot 131 in the casing lid 74a generally parallel to motor output shaft 120. A flexible seal 132 is fitted over slot 131 and is formed with a slit through which pin 130 projects. Pin 130 passes through an opening in the actuating rod 80 for the valve member 78 and is retained by a screw 133 (FIG. 6).

Two micro switches 134 and 136 are mounted on the underside of lid 74a and are positioned to be operated by the links 126, 127 respectively in the extreme end positions of the valve member 78. For example, as shown in FIG. 4, valve 78 is in an intermediate, partly closed position. If motor output shaft 120 turns through an appropriate angular amount in the clockwise direction, the outer link 127 will contact micro switch 136 and the valve member 78 will at that time be in its fully open position. As shaft 120 continues to rotate, the linkage will cause actuating rod 80 to move down and close the valve. When the valve is fully closed, the inner link 126 will contact micro switch 134 and provide an appropriate signal.

As mentioned previously, the valve includes a valve casing generally denoted 76. The casing is made of three plastic mouldings, namely two end mouldings 138 and 140 and a centre moulding 142 coupled together by bolts 144. The two end mouldings 138 and 140 are essentially the same, each comprising a generally octagonal base plate having a sleeve protruding outwardly therefrom. The sleeve associated with member 138 is denoted 84 and is visible in FIG. 2. The corresponding sleeve for member 140 is denoted 146 and is visible in FIG. 5. This sleeve extends through an opening in the housing lid 74a and it will be seen that the valve casing is attached to the lid by the bolts 144. The two sleeves 84 and 146 are internally screw threaded and receive connecting pipe sections.

The centre part 142 of the valve casing includes an upward extension 148 which forms a housing for the valve member 78. The valve member 78 is in the nature of a flat plate or slide having a rounded lower end 78a and part 142 is shaped internally to define a guideway for the valve member 78. Part 142 also has a centre opening 150 (FIG. 5) which aligns generally with the interior of the sleeves 84 and 146. Two annular sealing elements 152 are provided around the opening and protrude inwardly into the path of valve member 78 so as to form an effective water-tight seal against opposite faces of the member.

Control valve 58 has been found to particularly advantageous for use in a solar heating system for a number of reasons. As noted above, the actuating linkage for the valve is made of a plastic material so as to eliminate any possibility of an electrical short between the motor 118 and the water flowing in the system. Also, because the valve member 78 closes and opens progressively under smooth motor control the flow of water is not stopped or restarted abruptly so that problems due to water "hammer" or knock are avoided.

Reference will now be made to FIG. 7 which is a diagrammatic illustration of the electrical circuit of the solar heating system. The circuit includes a printed circuit board housed within the controller 64 of the system. The printed circuit board is generally indicated by reference numeral 154; however, details of the electrical circuit itself has not been shown but will be readily apparent to a person skilled in the art. The board forms part of the controller 64 and is located within its casing 114. External components connected to the printed circuit board are the temperature sensors 61 and 62, and the micro switches 134 and 136 and motor 118 of control valve 58. An external a.c. power supply is connected to the circuit at terminals generally indicated by reference numeral 156. The circuit is designed to operate with either a 110 v or 220 v power supply and appropriate ones of the terminals will be used depending on the supply available. The terminals 156 are connecter to a transformer forming part of a 12 volt power supply 158 for the motor 118 of control valve 58. Connected in the output of power supply 158 are relay contacts which include a common contact 160 and two secondary contacts 162 and 164 which can be connected with contact 160 by a switch member. The contacts 162 and 164 respectively define with contact 160 a normally closed and a normally open pair of contacts. The switch member associated with the contacts is controlled by a relay coil 166 which can energized by a driver (amplifier) 168.

Referring back to Fig. 2, it will be seen that controller 64 has two control knobs 170 and 172, and a meter 174. The meter has a scale indicating temperature. Knob 170 is coupled to a variable resistance 176 (FIG. 7) while knob 172 is coupled to a four position switch indicated by reference numeral 178 in FIG. 7. Switch 178 has two banks each of four contacts. The four positions of switch 178 are denoted respectively as "OFF", "ON", "AUTO" and "POOL SELECT". The two banks of contact of switch 178 are denoted respectively as $178_1$ and $178_2$ in FIG. 7.

The two temperature sensors 61 and 62 are located remote from controller 64 and are connected to the circuit on board 154 by appropriate leads. Each sensor is in the form of a silicon thermocouple. Suitable thermocouples are available from Texas Instruments. Each thermocouple is mounted in a housing which is secured externally on an appropriate one of the pipes of the solar heating system so that the thermocouple is closely adjacent the surface of the pipe. Referring back to FIG. 2, the housing of temperature sensor 61 is visible at 180 and is secured to pipe 106 by two ring clamps 182. It will be noted that this sensor is positioned just upstream of check valve 104 and will accordingly provide an indication of the temperature of the water leaving the pool. The other sensor (62) is of similar form and is mounted on the return line 38 adjacent to the panels (see FIG. 1). In this position, sensor 62 can serve two functions. When water is flowing in return line 38, the sensor will provide an indication of the temperature of that water, and when the solar panels are not in use and there is no water in return line 38, the sensor will indicates ambient temperature.

The silicon thermocouples of sensor 61 and 62 have the characteristic of providing a resistance which varies with temperature in linear fashion. The sensors are calibrated so that relay 166 will be operated when a 10° F. temperature difference exists between the points of the system monitored by the two sensors, provided variable resistance 176 has been appropriately preset (see later) and switch 178 has been set to operate in the "AUTO" mode. The four positions of switch 178 are "OFF", "ON", "AUTO" and "POOL SELECT". In the "OFF" position control valve 58 is in the open position and water will circulate normally through the circulation circuit without passing through the solar panels. In the "ON" position driver 168 will energize relay 166 and close the normally open pair of contacts 160, 164. At this time, control valve 58 will be open as will micro switch 136, while micro switch 134 will be closed. Accordingly, motor 118 will be energized through switch 134 to cause the valve member 78 to move down and close the control valve 58. Water will then be diverted through the solar panels irrespective of the temperature conditions detected by the sensors 61 and 62. The system will remain in this mode until 178 is returned to "OFF". At that time, relay 166 will de-energize, opening contacts 160, 164 and closing contacts 160, 162. Motor 118 will then be energized through micro switch 136 so that valve member 78 will be raised to open valve 58 until micro switch 136 is again opened.

In the "AUTO" position of switch 178 the operation of the system will be controlled by the sensors 61 and 62. Assuming variable resistance 178 has been appropriately set, when the sensor 61 and 62 detect a 10° F. difference in temperature between the points being monitored, relay 166 will be energized to close valve 58 as described previously. When the temperature difference detected by the sensors falls below 10° F., relay 166 will be de-energized and valve 58 will again be opened.

In each of the first three positions of switch, the meter 174 will indicate the temperature detected by sensor 61; that is effectively the pool temperature.

When 178 is moved to the "POOL SELECT" position meter 174 will indicate a temperature reading depending on the setting of variable resistance 176. This resistance is calibrated so that it can be adjusted (by turning knob 172) to set a perdetermined temperature required in the pool. First, as knob 172 is turned, the temperature reading on meter 174 will vary. When a predetermined temperature has been selected, switch 178 will then be returned to the "AUTO" position. In this position, the system will operate as discussed above until the temperature detected by sensor 61 (the termperature of the pool) reaches the preselected temperature. At this time, the variable resistance 176 will cause relay coil 166 to be de-energized so that control valve 58 will open and the water will be drained from the solar panels. Thus, in order for the water to flow through the solar panels in the "AUTO" position of switch 178, the temperature detected by sensor 61 must be above the selected temperature and the temperature difference between the two sensors must be at least 10° F. If either of these conditions is not fulfilled, valve 58 will open and the panels will drain.

It will of course be appreciated that the particular form of circuit shown is not essential. In a less sophisticated circuit, the circuit controller might have only "OFF" and "ON" positions with no provision for automatic operation or selection of pool temperature. In another embodiment, an "AUTO" function could be added. In the latter event, the circuit could be controlled by a simple roof mounted temperature sensor, e.g. in the nature of a thermocouple.

It will further be appreciated that many other modifications are possible within the broad scope of the invention. For example, although the particular form of control valve illustrated and described herein has been found to be particularly advantageous, other forms of valve may be used. In a less sophisticated form of solar heating system, a manually operable control valve could be used. Such a valve could, for example, be similar to valve 58 but without the motor and associated linkage; thus, the actuating rod 80 would in that event be operated manually. However, other types of valve could also be used. Preferably, whatever valve arrangement is used it should not be hydraulically operated using water from the circulation circuit. Conversely, the valve 58 described and illustrated herein may find application in other forms of solar heating system apart from that provided by the invention.

Finally, it should be noted that, although the preceding description is directed primarily to solar heating systems for swimming pools, the invention is not limited in that regard and may be employed for heating other like enclosed bodies of water.

I claim:

1. A solar heating system for a swimming pool and the like, comprising:
   means defining a main water circulation circuit having an inlet through which water can be removed from the pool, and an outlet through which water can be returned to the pool;
   a pump in the said circuit for conveying water from said inlet to said outlet;
   a solar collector assembly including at least one solar collector panel, water flow and return lines connected to said panel and circulation circuit and arranged to allow water to flow from said circuit through said panel from bottom to top and return to said circuit, one-way valve means in said return line for preventing water flowing into said panel along said line, and vacuum breaker means for admitting air to said panel during draining of water therefrom;
   a venturi unit connected in said circulation circuit and defining a water flow passageway extending from an inlet to an outlet of said unit, a throat disposed in said passageway between said inlet and outlet, and a secondary connection communicating with said passageway immediately downstream of said throat so that normal flow of water along said passageway induces a suction effect in said secondary connection;
   said flow line of the solar collector assembly being coupled to said secondary connection of the venturi unit, and said return line being coupled in said circulation circuit downstream of the venturi unit; and, control valve means disposed in said circuit between said venturi unit and said return line and operable between open and closed positions, whereby, in said closed position, water is prevented from flowing through said venturi unit outlet and is diverted through said secondary connection of the venturi unit and through said solar collector assembly for heating by solar energy and return to the pool through said return line and circuit outlet, and in said open position of said valve means, water flows through said venturi unit from said inlet to said outlet and said suction effect in the secondary connection of the venturi unit causes water to be drawn by suction from the solar collector assembly and into the circulation circuit for positive draining of said assembly.

2. A system as claimed in claim 1, wherein said venturi unit includes a generally T-shaped housing, said secondary connection of the venturi unit defining the stem of the T and wherein said throat is defined by a nozzle-like insert secured in the housing and extending along said passageway from the venturi inlet towards said outlet.

3. A system as claimed in claim 1 wherein said control valve means comprises a slide valve including a valve casing disposed in said water circulation and defining a water flow passageway, and a valve member slidably mounted in said casing for movement in a direction generally normal to the direction of water flow along said passageway between a closed position in which said passageway is obstructed, and an open position in which the valve member is withdrawn at least substantially clear of said passageway.

4. A system as claimed in claim 3, wherein said valve is power operated and includes an electric servo motor having an rotary output shaft and an electrically insulated linkage coupling said shaft to the valve member and arranged so that rotation of the shaft causes said member to reciprocate between its open and closed positions, and wherein the system further includes motor control means operable to cause said motor to move the valve member between its said open and closed positions at appropriate times.

5. A system as claimed in claim 4, wherein said motor control means includes a control circuit and temperature sensing means coupled in said circuit and located to respond to the presence of solar energy available for heating water in said panel, said circuit being adapted to automatically operate said valve motor to close the valve and direct through said panel in the event that said sensing means indicate the presence of available solar energy, and to open said valve, causing the panel to drain in the event that said temperature sensing means indicates that insufficient solar energy is available to heat the water in said panel.

6. A system as claimed in claim 5 wherein said temperature sensing means includes first sensor exposed to the effect of solar radiation, and a second sensor arranged to monitor the temperature of water leaving said pool, and wherein the circuit is adapted to close said valve in the event that said sensors detect a temperature difference above a predetermined minimum, and to open said valve in the event that said temperature difference falls below said minimum.

7. A system as claimed in claim 6, wherein said first sensor is disposed in contact with said return line through which heated water is returned from the panel to said circulation circuit so that said sensor responds to ambient temperature when the solar collector assembly is not in use and there is no water flowing in said line, and to the temperature of the water in said line when the solar collector assembly is in use.

8. A system as claimed in claim 6, wherein the said circuit further includes manually operable means for selecting a temperature required in the pool, and wherein the circuit is arranged to override said sensors and permit the valve to close only when the pool temperature detected by said second sensor is below the temperature selected by said selecting means.

9. Control apparatus for a swimming pool solar heating system comprising a base board having the following components assembled thereon so as to form a pre-assembled unit therewith:

a venturi unit defining a water flow passageway extending from an inlet to an outlet of said unit, a throat disposed in said passageway between said inlet and outlet, and a secondary connection communicating with said passageway immediately downstream of said throat;

an inlet pipe communicating with said venturi inlet and adapted to be coupled in a water circulation circuit of a swimming pool;

a second pipe communicating with said secondary connection of the venturi unit and adapted to be connected to a flow line to a solar collector assembly;

a control valve coupled to said venturi unit outlet and adapted to be closed to prevent water flowing normally through said outlet;

an outlet pipe associated with said valve means and arranged to receive water flowing through said venturi unit outlet when said valve means is open; and, means in said outlet pipe adapted to permit coupling thereto of a return line from a solar collector assembly.

* * * * *